United States Patent Office 2,833,788
Patented May 6, 1958

2,833,788

PRODUCTION OF EPOXIDES

John R. Skinner, Oakland, Charles H. Wilcoxen, Jr., San Lorenzo, and George J. Carlson, Berkeley, Calif., assignors to Shell Development Company, New York, N. Y., a corporation of Delaware No Drawing. Application December 28, 1955
Serial No. 555,754

12 Claims. (Cl. 260—348.5)

This invention relates to the epoxidation of unsaturated hydroxy compounds. It deals with a new, efficient and economical process for converting ethylenic hydroxy compounds to the corresponding hydroxy epoxides, that is hydroxy compounds containing a

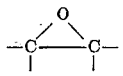

group in place of an ethylenic double bond of the starting hydroxy compound, by reaction with hydrogen peroxide.

It is known that compounds containing an ethylenic double bond in the molecule can be epoxidized by reaction with an organic peracid. Swern has described in Chemical Reviews, vol. 45, pages 1 to 68 (1949), a wide variety of ethylenic compounds which can be successfully epoxidized. This method of epoxidation, while quite satisfactory for laboratory preparations carried out on a small scale, has several disadvantages in commercial scale operations. Not only does the formation of the organic peracid reactant add to the expense but also their use complicates recovery of the desired product and in many cases introduces explosion hazards. Certain alpha,beta-ethylenic ketones have been epoxidized with alkaline hydrogen peroxide but the method is not operative with ethylenic hydroxy compounds. Indeed, while ethylenic hydroxy compounds have been reacted with hydrogen peroxide under a variety of conditions according to the published literature on the subject the products which were obtained were always oxidation products having fewer carbon atoms per molecule or hydroxylation products of the like. It has been suggested that epoxides may be transitory intermediates in certain hydroxylation reactions but the conditions of reaction have been such that epoxides, if formed at all, would be hydrated and no actual production of epoxides by direct reaction of hydrogen peroxide with an ethylenic hydroxy compound has been reported in the literature as far as can be determined.

It has now been found that by the use of a neutral salt of a tungstic acid as the catalyst for the reaction, ethylenic hydroxy compounds can be successfully converted to recoverable hydroxy epoxides by direct reaction with hydrogen peroxide. In accordance with the invention hydroxy epoxy compounds are produced by contacting an ethylenic hydroxy compound with hydrogen peroxide in the presence of a neutral salt of a tungstic acid which is soluble in the reaction mixture or a mixture of such salts and stopping the reaction before hydration of the epoxide ring takes place to a substantial extent.

Included among the neutral tungstic acid salts useful as catalysts in the new process are, besides the simple tungstates, the corresponding salts of the polytungstic acids which can be either homopolytungstic acids or heteropolytungstic acids. Suitable heteropolytungstic acid salts which can be used are, for example, the neutral salts of borotungstic acid, phosphotungstic acid, bismotungstic acid, selenotungstic acid, molybdotungstic acid, and the like. While the new epoxidation method can be carried out with any neutral salt of a tungstic acid, there are special advantages in using alkali metal or ammonium tungstates as catalysts for the reaction. However, especially when using low concentrations of catalysts for the reaction, it is feasible to employ less soluble tungstic acid salts such, for instance, as the alkaline earth metal tungstates, zinc tungstate, tin tungstate, aluminum tungstate, and the like. But it is usually more advantageous to use the alkaline earth or other inorganic salts which have undesirably low solubility when used as the simple tungstic acid salts in the form of their neutral polytungstic acid salts, especially the heteropolytungstic acid salts, since these generally have greater solubility in the reaction mixture.

The catalyst can be added as such or as a solution of the preformed neutral salt of a tungstic acid. Alternatively the neutral salt catalyst can be formed in the reaction mixture by adding a tungstic acid in its free state and sufficient of a base reactive therewith to form the neutral tungstic salt.

The amount of neutral salt catalyst which is used in carrying out the epoxidation can be varied but as a general rule will be in the range of about 0.02% to about 5% by weight of the total feed to the reactor, although amounts in the middle part of this range, for instance, amounts of about 0.1% to about 1.0% are generally more advantageous because it has been found that undesirable hydrogen peroxide decomposition is reduced by the use of low catalyst concentrations. On the other hand, with very low concentrations of catalyst the reaction times have to be extended so that not only is the plant capacity reduced but also hydrogen peroxide decomposition is increased and the hydroxy peroxide produced tends to undergo undesirable reaction, especially hydration in the presence of water.

The temperature which will be most desirable for carrying out the new process will depend upon the other reaction conditions chosen but in general will be within the range of about 30° C. to about 90° C. When the reaction is carried out as preferred using low concentrations of hydrogen peroxide in the reaction mixture, higher temperatures within this range can be used without excessive loss of hydrogen peroxide through decomposition than when higher hydrogen peroxide concentrations are employed. A particularly advantageous range of reaction temperatures for use when employing the preferred low hydrogen peroxide concentrations of less than about 0.02 gram moles per kilogram of reaction mixture, i. e. less than about 0.07% by weight, is about 45° C. to about 55° C.

The time of reaction used in the new epoxidation process should be chosen so as to minimize undesirable side reactions involving opening of the epoxide ring or rings of the product, especially hydration of the hydroxy epoxide by water present in the reaction mixture. The most suitable time will depend upon the reaction method chosen as well as upon the temperature of reaction and the concentration of neutral tungstic salt catalyst employed. With respect to their influence on the reaction time, reaction methods can be divided into two general classes. One of these classes may be defined as those reaction methods in which the concentration of the reactants (ethylenic hydroxy compound and hydrogen peroxide) is high relative to the concentration of the reaction product or products at least in the initial stages of reaction. Batch or once through continuous methods of reaction are typical of this class in which high reaction rates are favored so that shorter reaction times are possible while avoiding undesirable further reaction than is the case with reaction methods of the other class. This other class of reaction methods is that employing back-mixing of reacted mixture with the fresh feed so that the concentration of the reactants relative to reaction products is lower. Reaction rates are slower under these conditions where the initial reaction is carried out in a medium approaching the composition of the final reacted mixture being withdrawn from the unit. Recirculation-type reaction methods, as, for instance, with a single-stage continuously stirred reactor in which the feed of ethylenic hydroxy compound, hydrogen peroxide and catalyst, is added to a relatively large volume of reaction mixture circulating in a time tank and cooling coil, for example, while reacted mixture is continuously withdrawn from another point in the system for recovery of product is typical of this class of reaction methods. With reaction methods of this class, reaction times about three to four times as long as those which are suitable for batch reaction at the same temperature and catalyst concentration can be successfully used.

The higher the reaction temperature the shorter should be the reaction time under otherwise equal conditions in order to reduce undesirable side reactions of the epoxy group which is produced. Thus, for example, in batch reaction at a catalyst concentration of about 0.6% by weight of the reaction mixture, for temperatures in the range of about 30° C. to about 90° C., reaction times of about 7 hours to about 10 minutes are generally suitable, the higher temperatures being used at the shorter times and vice versa. Under these conditions most advantageously times of about 3 to about 1 hour are used at temperatures of about 45° C. to about 55° C. in order to favor higher ratios of epoxides to hydration products thereof in the final product. When using the single-stage continuously stirred reactor of the recirculation type previously mentioned, it is most advantageous to use reaction times of about 8.5 to about 4 hours at the preferred temperatures of about 45° C. to about 55° C. and correspondingly adjusted times in the range of about 22 hours to about ½ hour when using temperatures in the wider usable range of about 30° C. to about 90° C. and employing the same catalyst concentration. For other catalyst concentrations the reaction time is approximately in accordance with the relationship $time_1 \times catalyst\ concentration_1 = time_2 \times catalyst\ concentration_2$ where the catalyst concentrations and times are expressed in the same units.

The ethylenic hydroxy compound or mixture thereof being epoxidized and the hydrogen peroxide can be used in stoichiometric proportions or an excess of either of these reactants can be employed in the epoxidation. High rates of epoxidation are promoted and the relative rate of hydrogen peroxide decomposition is decreased by a high concentration of the ethylenic hydroxy compound being epoxidized in the reaction mixture. For this reason it is generally desirable to use an excess of ethylenic hydroxy compound to hydrogen peroxide. In order to reduce the cost of recovery of the excess ethylenic hydroxy compound it is usually advantageous to limit the amount of excess which is employed however. It is generally most advantageous to use about 0.35 to about 0.7 mole hydrogen peroxide per ethylenic double bond to be epoxidized, that is, mole ratios of monoethylenic hydroxy compound to hydrogen peroxide of about 3:1 to about 1.5:1.

As previously indicated, it has been found to be advantageous to maintain a low concentration of hydrogen peroxide in the reaction mixture. This method of operation reduces the ratio of the hydrogen peroxide decomposition rate to the epoxidation rate and promotes higher yields of hydroxy epoxide based on the hydrogen peroxide consumed. Preferably the hydrogen peroxide concentration is maintained below about 0.02 mole per kilogram of reaction mixture and most advantageously in the range of about 0.01 mole to about 0.005 mole per kilogram of reaction mixture. However, higher concentrations can be employed in the new process at a sacrifice in yield of hydroxy epoxide based on hydrogen peroxide. One suitable method of maintaining the desirable low concentration of hydrogen peroxide in the reaction is by staged addition of the peroxide to the reaction mixture at a rate about equal to its consumption in the process so that there is no substantial accumulation of unreacted hydrogen peroxide.

Batch, intermittent or continuous methods of reaction can be employed in carrying out the process of the invention. One convenient method of batch operation comprises adding the hydrogen peroxide to a reactor, preferably provided with means for intimately mixing the reactants and for controlling the reaction temperature, which has been previously charged with the ethylenic hydroxy compound to be epoxidized and with the neutral tungstic acid salt catalyst in the required amount. The hydrogen peroxide is preferably added at about its rate of consumption in the reaction as previously indicated in which case the reaction can be stopped after a short period of stirring following the final addition of hydrogen peroxide. Alternatively the hydrogen peroxide can be added in larger amounts or even all at once after which stirring is continued until substantially complete reaction of the peroxide has taken place although the yields of hydroxy epoxide based on peroxide will usually be lower than such conditions.

The process can be made continuous by continuously adding ethylenic hydroxy compound, hydrogen peroxide and neutral tungstic acid salt catalyst to the reaction mixture and continuously withdrawing reacted mixture at a corresponding rate so that the volume of mixture in the reactor remains substantially constant. Alternatively a pipe coil or tube bundle through which the reaction mixture is fed in indirect heat transfer relationship to a suitable temperature control medium, can be used for continuous reaction. In this method of operation the hydrogen peroxide is preferably introduced at spaced points along the path of flow of the reaction mixture so as to maintain the preferred low concentration of peroxide in the mixture as previously indicated. The procedure which has been found to give the best results in the new method of the invention is reaction in a single-stage continuously stirred reactor such as previously mentioned. This reactor is preferably equipped with temperature control means and the mixing means can conveniently be means for external circulation of the reactor contents for instance by a circulating pump which feeds reaction mixture taken off at the bottom of the reactor time tank back to the reactor. The feed streams of hydrogen peroxide solution, ethylenic hydroxy compound, catalyst and water are continuously fed to the reactor preferably by addition to the stream of externally circulating reaction mixture after continuous withdrawal therefrom of reacted mixture for recovery of the epoxidized product. In such single-stage continuously stirred reactors a large volume of reaction mixture relative to the feed is preferably employed and the feed is promptly diluted with and uniformly distributed throughout the reaction mixture to avoid undesirable local high concentrations of peroxide. This method of operation simplifies control of the hydrogen peroxide addition so that the desired uniform low concentration of peroxide in the mixture is readily maintained. By using an excess of ethylenic hydroxy compound to hydrogen peroxide as pointed out previously and a relatively high concentration of neutral salt of a tungstic acid catalyst of the order of about 0.3% to 1% by weight of the total feed, to promote epoxidation high yields of epoxide products can readily be obtained especially when conducting the reaction at a pH at which hydration of the epoxide is minimized.

Hydration of the epoxide product is catalyzed by both acid and basic conditions hence it is advantageous for highest yields to carry out the epoxidation reaction under approximately neutral conditions and most preferably a pH between about 6.5 and about 7.5 is used. Higher pH conditions can be employed at a sacrifice in yield and loss of hydrogen peroxide by decomposition. Small amounts of basic agents, for example sodium hydroxide or buffer salts such for instance as disodium hydrogen phosphate, potassium pyrophosphate, sodium stannate and the like, can be used to maintain the desired pH in the reaction mixture and thus promote rapid epoxidation and minimize hydration of the hydroxy epoxide and undesirable decomposition of the hydrogen peroxide. Buffers such as potassium pyrophosphate and sodium stannate have the added advantage of also being stabilizers which protect the hydrogen peroxide from undesirable decomposition during the reaction. Other types of hydrogen peroxide stabilizers, such for instance as ethylene diamine tetraacetic acid sodium salts and like chelating agents can also be used advantageously in the reaction mixture for this purpose.

Aqueous hydrogen peroxide can be successfully used as the epoxidizing agent in the new process. Hydrogen peroxide of about 10% to 90% concentration is suitable as feed to the process and most preferably hydrogen peroxide of about 25% to about 50% concentration is used. Where water soluble ethylenic hydroxy compounds such, for example, as the lower molecular weight ethylenic alcohols and the like are being epoxidized it is sometimes desirable to add additional water to the reaction mixture but the water introduced with the hydrogen peroxide may be sufficient for carrying out the reaction in a homogeneous aqueous medium. With less water soluble ethylenic hydroxy compounds on the other hand it may be desirable to add a mutual solvent to form a homogeneous reaction medium. Acetone, dioxane and the like are useful solvents for this purpose but other inert solvents can likewise be used. It is also feasible to operate with a heterogeneous reaction mixture comprising an aqueous hydrogen peroxide phase and a phase containing the ethylenic hydroxy compound but yields of hydroxy epoxide are usually lower under such conditions. Whatever the method of operation adopted the mole ratio of water present to hydrogen peroxide will usually be of the order of about 10:1 to 70:1.

After completion of the reaction the hydroxy epoxide product can be recovered from the reaction by distillation, extraction or any other of known suitable methods.

The following non-limiting examples illustrate in more detail some of the ways in which the new process can be carried out.

Example I

Allyl alcohol was epoxidized in a single-stage continuous stirred reactor equipped with steam heating coil. External circulation by a centrifugal pump taking reaction mixture from the bottom of the time tank back to the top of the tank at the rate of about one gallon per minute provided adequate stirring. The feeds, 20% by weight aqueous hydrogen peroxide, allyl alcohol and sodium tungstate solution, were metered into the externally circulating stream. Steady state product was removed as overflow from the time tank to a product cooler and receiver. A feed of 1.5 moles of allyl alcohol and 32.6 moles of water per mole of hydrogen peroxide with 0.579% by weight of neutral sodium tungstate catalyst having a pH of 7.3 was used for reaction at 45° C. and a residence time of 8.8 hours. The equilibrium concentration of hydrogen peroxide in the reaction mixture was 0.002 mole per 100 grams of mixture.

The product contained glycidol and glycerol in a mole ratio of 4.5 and the yield of glycidol was 72% of the theoretical based on hydrogen peroxide and 80% based on the allyl alcohol converted at 98.6% conversion of hydrogen peroxide and 60% conversion of allyl alcohol.

Example II

Using the same apparatus and reaction conditions as in Example I but with addition of 0.06% of sodium hydroxide to the feed to bring the pH to 8.1, the hydrogen peroxide and allyl alcohol conversions were 98.4% and 58%, respectively, and the yield of glycidol was 70% of the theoretical based on hydrogen peroxide and 79% based on allyl alcohol. The product contained 4.4 moles of glycidol per mole of glycerine.

Example III

The effect of reducing the reaction time and the concentration of hydrogen peroxide in the reaction mixture at an increased mole ratio of allyl alcohol to hydrogen peroxide is shown by the following test carried out in the single-stage continuously stirred reactor described in Example I.

Reaction conditions:
  Molar feed ratios:
    Allyl alcohol to hydrogen peroxide, 3.0
    Water to hydrogen peroxide, 28.4
  Catalyst, 0.588% by weight of feed mixture
  Equilibrium hydrogen peroxide concentration, 0.001 mole per 100 grams reaction mixture
  Temperature, 45° C.
  Residence time, 4.1 hours
  pH, 7.4
Results:
  Yield of glycidol:
    77% of theoretical based on hydrogen peroxide
    84% of theoretical based on allyl alcohol
  Conversion of hydrogen peroxide, 99.3%
  Moles of glycidol per mole of glycerine in product, 14.5

Example IV

Using calcium phosphotungstate as the catalyst in a molar equivalent amount instead of sodium tungstate and employing 2.5 moles of allyl alcohol per mole of hydrogen peroxide by the reaction method of Example III at 50° C. for 4.5 hours, reaction time, an equally good yield of glycidol is obtained.

Example V

Epoxidation of methallyl alcohol under the conditions of Example IV but using 0.55% by weight, based on the feed, of sodium tungstate as catalyst at a pH of 7.2 gives a high yield of 2-methyl glycidol.

Example VI

Using a three-stage continuous reactor comprising three time tanks in series, each equipped with an internal steam-heated coil for temperature control and arranged for external circulation of the contents of each stage at about one gallon per minute for stirring, allyl alcohol was epoxidized to glycidol. The feeds of allyl alcohol, hydrogen peroxide and sodium tungstate catalyst were metered to the first or highest reaction stage. Steady state product from the first stage overflowed and was fed by gravity to the second reaction stage, from which it overflowed and passed to the final reaction stage in the same way. Product was collected from the third reaction stage after a leveling out period of about three reactor charges. The reaction conditions were as follows:

Temperature, each stage, 45° C.
Residence time, each stage, 0.9 hour
Feed mole ratios, allyl alcohol:$H_2O$:$H_2O_2$=1.5:33.4:1
$Na_2WO_4$ catalyst, 0.58% by weight of total feed Using 0.09% by weight of nitric acid in the feed mixture the equilibrium conditions in the three stages were:

| Stage | 1 | 2 | 3 |
| --- | --- | --- | --- |
| pH | 6.1 | 6.5 | 6.4 |
| Moles $H_2O_2$/100 grams of reaction mixture | 0.0664 | 0.0248 | 0.0027 |
| Percent Conversion of $H_2O_2$ | 52 | 82 | 98 |

The product contained 14.1 moles of glycidol per mole of glycerine, the glycidol yield being 66% of the theoretical based on the hydrogen peroxide applied and 74% based on the allyl alcohol at an allyl alcohol conversion of 60%.

*Example VII*

Allyl alcohol was epoxidized by batchwise reaction with hydrogen peroxide in a stirred reactor into which the allyl alcohol and sodium tungstate catalyst were initially charged, after which aqueous hydrogen peroxide was run in over a period of about ten minutes while maintaining the temperature at 50° C. The stirring was then continued at 50° C. until 99% conversion of hydrogen peroxide had taken place, which required 27 hours at the catalyst concentration used (0.05% $Na_2WO_4 \cdot 2H_2O$ based on the total weight of mixture). Sodium stannate, 500 P. P. M. $Na_2SnO_3 \cdot 3H_2O$, was added as stabilizer and buffer giving an initial pH of 7.4 which fell off as the reaction continued. Using a mole ratio of allyl alcohol to water to hydrogen peroxide of 1.46:33.5:1 the yield of glycidol was 62.1% based on hydrogen peroxide consumed and 68.6% based on allyl alcohol consumed. The lower yield reflects loss of hydrogen peroxide due to the undesirably high initial concentration of hydrogen peroxide (0.1418 mole per 100 grams) in the reaction mixture. The allyl alcohol conversion in the process was 62% and the mole ratio of glycidol to glycerine in the product was 3.5.

*Example VIII*

Butenediol ($HO-CH_2-CH=CH-CH_2-OH$) was epoxidized by batch reaction with 30% aqueous hydrogen peroxide added in a ratio of about one mole per mole of butenediol to a charge of 2.5 moles of butenediol in 1.5 liters of water containing 20 millimoles of tungstic acid and 22 milliequivalents of sodium hydroxide. After addition of the hydrogen peroxide in 3 hours' reaction at 50° C. 18.2 millequivalents of additional sodium hydroxide were added and the reaction was continued for another half hour, the final pH being 7.4. Analysis showed a 90% yield of 1,4-hydroxy-2,3-epoxybutane which was recovered by distilling off the water under reduced pressure at a kettle temperature that did not exceed 50° C. Recrystallization of the crystalline product, M. P. 51–53° C., epoxide value 0.874 equivalent per 100 grams, gives a product, M. P. 52–53° C., epoxide value 0.92 equivalent per 100 grams, from which the pure product, M. P. 53–54° C., was sublimed on a steam bath at 2 mm. pressure.

It will be understood that the foregoing examples are merely illustrative and that the present invention broadly comprises contacting a hydroxy ethylenic compound in the liquid phase with hydrogen peroxide in the presence of a neutral salt of a tungstic acid and stopping the reaction when substantial formation of the corresponding hydroxy epoxide has taken place. In addition to the hydroxy ethylenic compounds mentioned in these examples other compounds of this class can be used in the new process of the invention. Specific examples of hydroxy ethylenic compounds which can be epoxidized successfully are methallyl alcohol, crotyl alcohol, allyl carbinol, methyl vinyl carbinol, dimethyl allyl carbinol, oleyl alcohol, citronellol, geraniol, linalool, cyclohexenol, the terpineols, cinnamyl alcohol, and related mono- and polyolefinic mono- and polyhydroxy alcohols. The preferred hydroxy ethylenic starting materials are the hydroxy-substituted ethylenic hydrocarbons having 3 to about 18 carbon atoms per molecule. The water-soluble monoethylenic alcohols and diols are particularly advantageous starting compounds for epoxidation by the new method.

The invention will thus be seen to be capable of wide variation not only with respect to the hydroxy ethylenic compounds which can be epoxidized and the neutral salts of the tungstic acids which can be employed as catalysts but also in regard to the method of carrying out the new process in its various modifications. The invention will accordingly be recognized as not limited to the examples used as illustrations nor by any theory proposed in explanation of the improved results which are obtained.

We claim as our invention:

1. In a process for producing an epoxide by reacting hydrogen peroxide with a monoethylenic alcohol of 3 to 18 carbon atoms per molecule the improvement which comprises carrying out the reaction in the presence of at least 0.2% by weight of the feed to the reaction of a water soluble neutral salt of a tungstic acid and discontinuing the reaction before substantial opening of the epoxide ring produced takes place.

2. A process in accordance with claim 1 wherein the reaction is carried out with about 0.02% to about 5% by weight of the reaction mixture of a neutral tungstate.

3. A process in accordance with claim 2 wherein the reaction is carried out at a temperature between about 30° C. and about 90° C.

4. A process in accordance with claim 1 wherein a water-soluble beta,gamma-ethylenic alcohol is reacted with aqueous hydrogen peroxide using not more than about 1% by weight of said neutral salt of a tungstic acid.

5. A process in accordance with claim 4 wherein the reaction is carried out by feeding said alcohol, hydrogen peroxide and neutral salt to a reaction zone maintained at about 30° to about 90° C., withdrawing reacted mixture from said zone and recovering epoxidized alcohol therefrom.

6. A process in accordance with claim 5 wherein the neutral salt is sodium tungstate.

7. A process in accordance with claim 5 wherein the neutral salt is a salt of a heteropolytungstic acid.

8. A process in accordance with claim 5 wherein the alcohol is a diol.

9. A process in accordance with claim 5 wherein the diol is butenediol.

10. A process in accordance with claim 5 wherein the alcohol is a monohydric alcohol.

11. A process of producing glycidol which comprises adding hydrogen peroxide to allyl alcohol in an aqueous medium containing at least about 0.02% by weight of a neutral alkali metal salt of a tungstic acid, the rate of addition being controlled so that the concentration of hydrogen peroxide in the reaction mixture is maintained below about 0.02 gram moles per kilogram of reaction mixture and discontinuing the reaction before substantial reaction of the glycidol produced takes place.

12. A process in accordance with claim 11 wherein the hydrogen peroxide is introduced at spaced points along the path of flow of the reaction mixture as it flows through a reaction zone and the concentration of neutral salt catalyst is about 0.2% to about 0.5% by weight.

References Cited in the file of this patent

UNITED STATES PATENTS

| | | |
| --- | --- | --- |
| 2,312,535 | Fieser | Mar. 2, 1943 |
| 2,414,385 | Milas | Jan. 14, 1947 |
| 2,500,599 | Bergsteinsson | Mar. 14, 1950 |
| 2,543,419 | Niederhauser | Feb. 27, 1951 |
| 2,754,325 | Smith | July 10, 1956 |
| 2,786,854 | Smith | Mar. 26, 1957 |